Dec. 22, 1936.   J. DICHTER   2,065,305
METHOD OF MOLDING AN ARTICLE AND APPARATUS THEREFOR
Filed Oct. 9, 1934   2 Sheets-Sheet 1
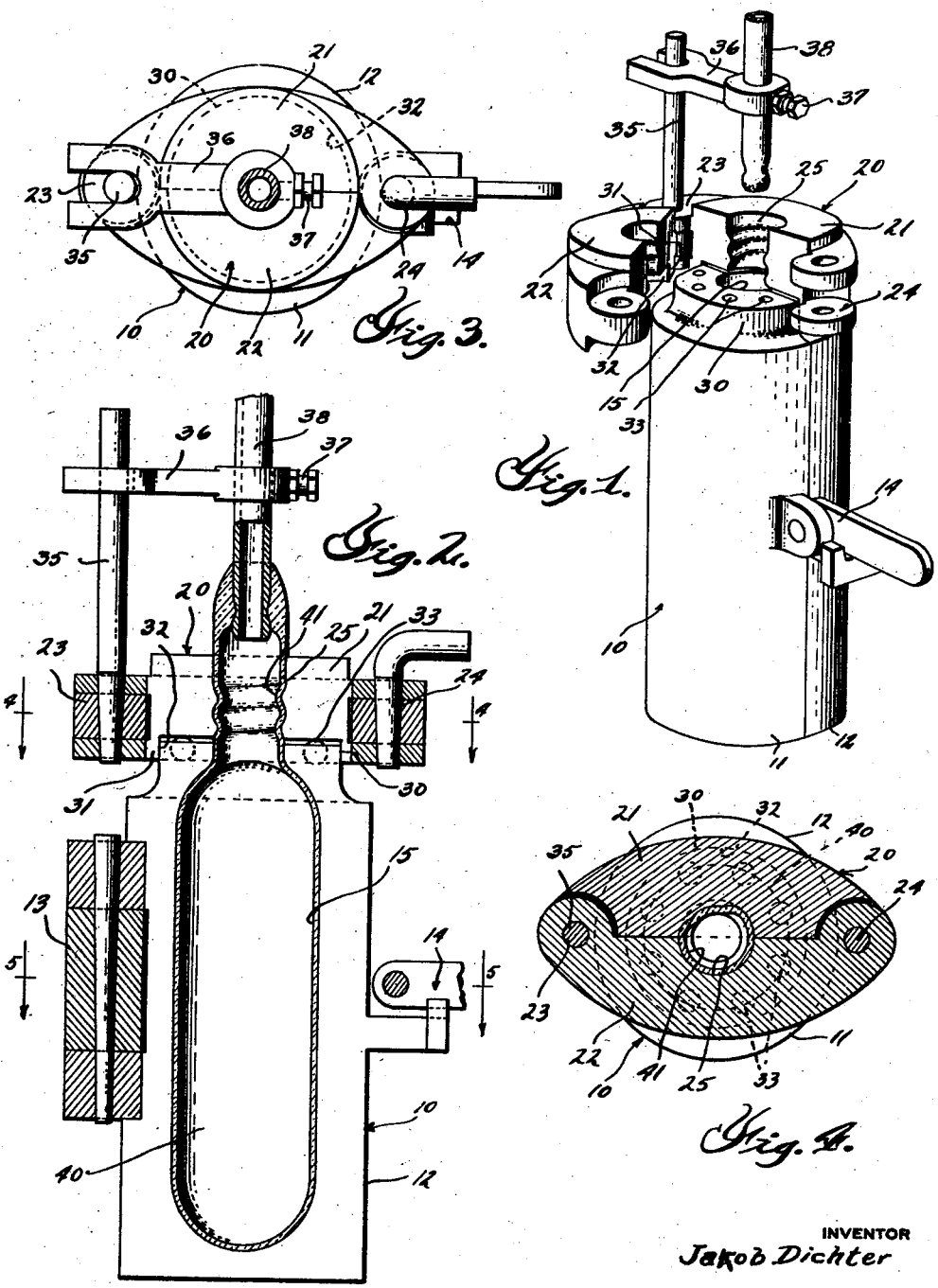
INVENTOR
Jakob Dichter
BY
ATTORNEY Dec. 22, 1936.  J. DICHTER  2,065,305
METHOD OF MOLDING AN ARTICLE AND APPARATUS THEREFOR
Filed Oct. 9, 1934   2 Sheets-Sheet 2
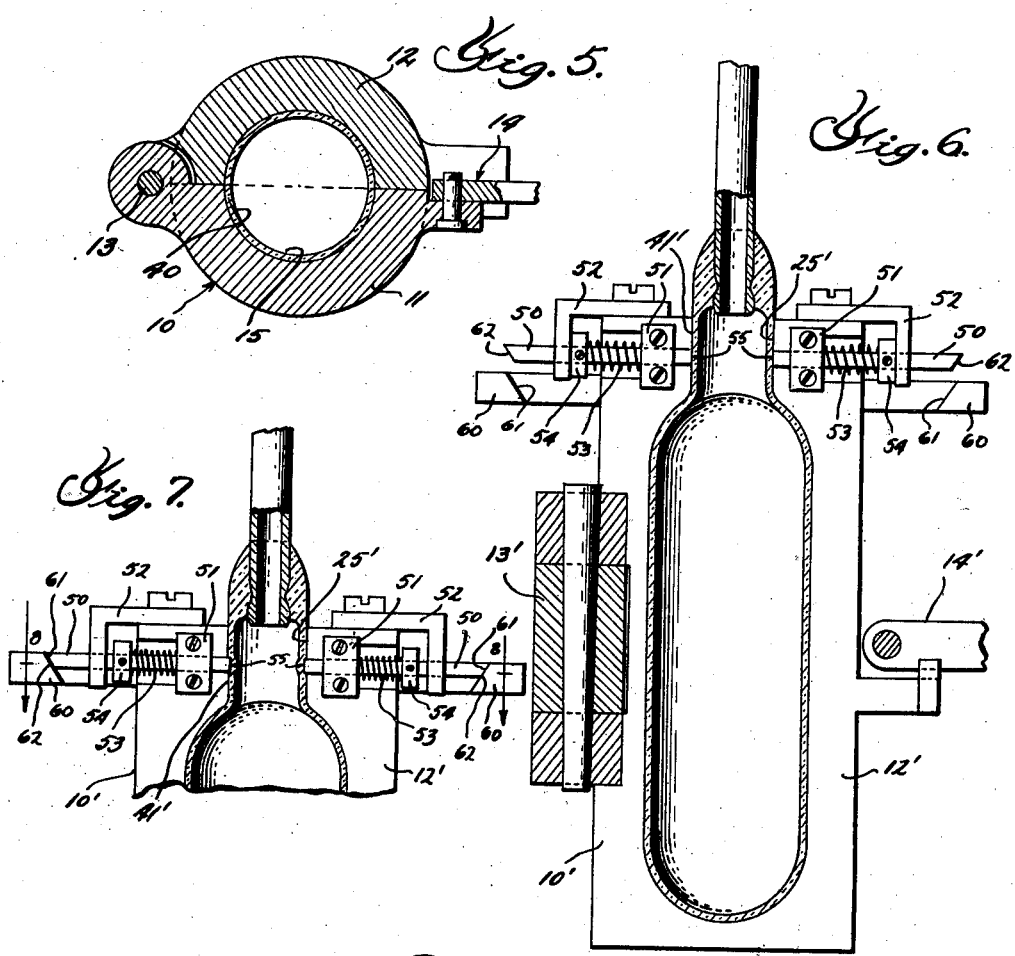
INVENTOR
Jakob Dichter
BY Charles B. Belknap
ATTORNEY Patented Dec. 22, 1936

2,065,305

UNITED STATES PATENT OFFICE 2,065,305

METHOD OF MOLDING AN ARTICLE AND APPARATUS THEREFOR

Jakob Dichter, Berlin-Schoneberg, Germany

Application October 9, 1934, Serial No. 747,595
In Germany June 3, 1933

2 Claims. (Cl. 49—69)

This invention relates generally to molds and has particular reference to a mold adapted for the forming of articles, portions of which are circular in cross section.

One of the primary objects of this invention is to provide a mold in which an article having a portion circular in cross sectional shape and having a second portion deviating from the portion thereof of circular cross sectional shape may be formed.

A further object of this invention is to provide a mold of the above mentioned character by which an article may be molded without forming a seam in the portion of the article which is circular in cross sectional shape.

Numerous other objects and advantages of this invention will become more apparent as the following description proceeds particularly when reference is had to the accompanying drawings wherein Fig. 1 is a perspective view of a mold constructed in accordance with the teachings of this invention;

Fig. 2 is a vertical sectional view through the mold shown in Fig. 1;

Fig. 3 is a top plan view of the mold;

Fig. 4 is a sectional view taken substantially on the line 4—4 of Fig. 2;

Fig. 5 is a sectional view taken substantially on the line 5—5 of Fig. 2;

Fig. 6 is a vertical sectional view through a slightly modified form of mold;

Fig. 7 is a fragmentary sectional view of a portion of the mold shown in Fig. 6, showing parts of the mold as they appear after they are moved during the molding operation; and Fig. 8 is a sectional view taken substantially on the line 8—8 of Fig. 7.

The invention will find particular utility in the molding of hollow glass articles such as bottles or the like in which the bottles have cylindrical body portions and neck portions which are not cylindrical. For the sake of illustration therefore, the invention will be described as being embodied in molds for forming bottles of the above character although it is to be clearly understood that the inventive principles may be embodied in molds for forming other articles and that further the articles formed may have one or more portions circular in cross section and one or more portions which are not circular in cross section.

In the forming of glass bottles having cylindrical body and neck portions, it is customary to blow the bottles in molds and to rotate the bottles within the molds while the bottles are being blown. This rotation of the bottles during the blowing operation prevents the formation of seams in the bottles along the lines where the mold sections join.

If, however, it was desired to form a bottle, a portion of which was not cylindrical, as for example, a bottle having a cylindrical body portion and a threaded or angularly shaped neck portion, it has heretofore been necessary to blow the bottle without rotating the bottle during the blowing operation. When the bottle was blown stationary, it had seams in it and these seams caused strains in the walls of the bottle producing weak portions at which the bottle frequently broke.

In its broader aspects, therefore, the present invention contemplates the provision of a mold in which an article such as a bottle, may be molded and in which the portion of the bottle which is cylindrical or circular in cross sectional shape may be rotated relative to the mold during the molding operation, while the portion of the bottle which is not circular in cross sectional shape will not be rotated with reference to the portion of the mold by which it is enclosed. It will be apparent as the following description proceeds, that under the teachings of this invention bottles having any desired configuration may be produced and that the portions of the bottle which are not circular in cross sectional shape may be located at any portion of the bottle.

Referring then particularly to the drawings wherein like reference characters designate corresponding parts throughout all views, the numeral 10 designates generally a mold in which the body portion of a bottle may be blown. The mold comprises the half sections 11 and 12 suitably hinged together as at 13 and provided with a suitable locking means 14 whereby the mold halves may be locked in closed position. It will be understood that the cavity 15 formed by the mold halves 11 and 12 is throughout its length circular in cross sectional shape so that during the molding operation the bottle may be rotated in this cavity.

For producing the neck of the bottle, there is provided a second mold designated generally by the reference character 20. This mold comprises the sections 21 and 22 suitably hinged together as at 23 and provided with a suitable locking means 24 whereby the mold halves may be held in closed position. In the embodiment of the invention illustrated, the cavity 25 in the mold 20 is shown as being provided with threads although it is to be understood that this cavity may have any desired cross sectional shape such, for example, as square, triangular or the like. The cavity 25 communicates with the cavity 15 when the molds 10 and 20 are associated with each other as clearly illustrated in Fig. 2 of the drawings.

It is, of course, important that the mold 20 be accurately centered with reference to the mold 10 and for this purpose the upper end of the mold 10 is machined to provide a finished surface 30 which is enclosed by a depending portion 31 of the mold 20. The depending portion of the mold 20 is provided with a finished surface 32 which turns on the surface 30 of the mold 10 and is preferably provided with suitable bearings, such as the balls 33, to facilitate the free turning of the mold 20 on the mold 10.

To insure the turning of the mold 20 with the bottle during the blowing of the latter, the pin 35 which constitutes the pintle of the hinge 23, is extended upwardly and is embraced by yoke 36. This yoke is fixed as by the set screw 37 to the blow pipe 38 which in accordance with the usual practice is provided for blowing air into the bottle and for turning the bottle during the blowing operation.

In the use of the mold it will be apparent that the body portion 40 of the bottle, which body portion is circular in cross sectional shape, will be blown in the mold 10. The neck portion 41 of the bottle, which neck portion may be threaded as illustrated or may have any desired cross sectional shape deviating from the circular cross sectional shape of the body, will be blown in the mold 20. During the blowing operation, the blow pipe 38 together with the bottle being blown will be rotated, the mold 10 remaining stationary so that the body portion of the bottle rotates relative to the mold 10 and the mold 20 rotating with the bottle and relative to the mold 10. As brought out before, the rotation of the mold 20 will be effected by yoke 36, which is rigidly fixed to the blow pipe 38 and which engages the pintle 35 of the hinge 23. After the blowing operation is completed, the bottle may be removed by first opening the mold 20, as illustrated in Fig. 1 of the drawings, and by then opening the mold 10, the latter being held closed by the mold 20 and latch 14.

From the above it will be apparent that the mold in substance comprises a plurality of sections which are movable relative to each other during the molding operation. Thus while the molds 10 and 20 might be termed separate molds, they are in fact sections of the complete bottle mold. These sections are movable relative to each other during the molding operation, the lower section 10 remaining stationary while the upper section 20 turns with the bottle being blown. It will thus be apparent that the body portion of the bottle turning as it does in the mold section 20 during the molding operation will be free from seams and thus wholly free from weakened portions.

In Figs. 6 to 8 inclusive, a slightly modified form of mold is illustrated, this mold being adapted for the forming of indentations or the like on the neck of the bottle. As illustrated, there is provided a mold 10' formed of halves 11' and 12' hingedly connected together as at 13' and provided with suitable locking means as at 14'.

Carried by the mold 10' are pins 50 which extend radially of the neck cavity 25'. These pins are slidably mounted in suitable supports 51 and 52 and are normally urged radially outwardly by springs 53. A collar 54 on each pin arranged to engage its respective bracket 52 limits outward movement of the pins.

The inner ends 55 of the pins are normally flush with the mold wall defining the neck cavity 25 so that during the initial portion of the molding operation, the bottle being blown may be readily rotated within the stationary mold 10'. After the bottle has been blown, however, the pins 50 may be moved inwardly by the arms 60 which have cam faces 61 adapted to engage the inclined outer ends 62 of the pins 50.

In the operation of this embodiment of the invention, it will be apparent that during the blowing of the bottle, the latter may be rotated so that no seams will be formed in the walls of the bottle. After the blowing operation has been completed, the pins 50 may be moved radially inwardly to produce indentations in the neck 41' of the bottle. While only two pins 50 are illustrated, it will be apparent that any number of pins may be provided to produce any number of indentations in the bottle neck. Still further, while the pins are illustrated as being carried by the upper end of the mold 10', it will be apparent that if desired, these pins might be carried by a rotating section, such as section 20, in the first embodiment of the invention. In any event, however, in the second embodiment of the invention, the mold 10' constitutes one section of the complete bottle mold, while the pins 50 constitute other sections which are movable relative to the section 10' during the molding operation.

From the above it will be apparent that the invention provides a mold capable of forming an article having a portion of circular cross sectional shape and having a second portion of some cross sectional shape other than circular. The mold provides that the article being molded may have the portion thereof which is of circular cross sectional shape rotated relative to the mold during the molding operation so that no seams will be formed in the circular portion of the article. Thus the invention provides a mold by which articles having practically any desired configuration may be conveniently and economically produced.

While the invention has been described with some detail, it is to be understood that the description is for the purposes of illustration only and is not definitive of the limits of the inventive idea, the right being reserved to make such changes in the details of construction and arrangement of parts as will fall within the purview of the attached claims.

What I claim as my invention is:

1. In a device of the character described, a stationary mold having a cavity for receiving the body of a bottle being blown, and means including pins movable radially of the neck of the bottle being blown for forming indentations in the neck of the bottle, the inner ends of said pins conforming to the contour of and being normally flush with the mold wall whereby the bottle being blown may be rotated relative to the mold.

2. The method of molding an article having a portion circular in cross section and a second portion formed with indentations, which consists in enclosing the article in a mold having pins mounted in a wall thereof for movement radially of the mold, effecting relative rotation between the article being molded and the mold, and after a predetermined rotation of the article being molded effecting a movement of the pins radially inwardly of the mold.

JAKOB DICHTER.